United States Patent
Myers

(10) Patent No.: US 9,951,244 B2
(45) Date of Patent: Apr. 24, 2018

(54) POLYMER COATED METALLIC SUBSTRATE AND METHOD FOR MAKING

(71) Applicant: AK Steel Properties, Inc., West Chester, OH (US)

(72) Inventor: Frederick Alan Myers, Middletown, OH (US)

(73) Assignee: AK Steel Properties, Inc., West Chester, OH (US)

( * ) Notice: Subject to any disclaimer, the term of this patent is extended or adjusted under 35 U.S.C. 154(b) by 202 days.

(21) Appl. No.: 14/880,446

(22) Filed: Oct. 12, 2015

(65) Prior Publication Data

US 2016/0032133 A1 Feb. 4, 2016

Related U.S. Application Data

(63) Continuation of application No. 12/830,618, filed on Jul. 6, 2010.

(Continued)

(51) Int. Cl.
*C09D 133/00* (2006.01)
*C09D 133/08* (2006.01)
(Continued)

(52) U.S. Cl.
CPC .......... *C09D 133/00* (2013.01); *C08K 3/0008* (2013.01); *C08K 5/0008* (2013.01);
(Continued)

(58) Field of Classification Search
None
See application file for complete search history.

(56) References Cited

U.S. PATENT DOCUMENTS 3,238,168 A 3/1966 Wolff et al.
3,801,550 A 4/1974 Adelman
(Continued)

FOREIGN PATENT DOCUMENTS

AU 2010270696 A1 1/2012
CA 2766185 A1 1/2011
(Continued)

OTHER PUBLICATIONS

Australian Office Action dated Sep. 10, 2012 for Application No. AU 2010270696, 2 pgs.

(Continued)

*Primary Examiner* — Erma C Cameron
(74) *Attorney, Agent, or Firm* — Frost Brown Todd, LLC

(57) ABSTRACT

A composite material comprising a metallic substrate and a coating on at least one side of the metallic substrate, wherein the coating comprises an acrylic or styrene-acrylic based polymer and is less than about 0.2 mils thick, wherein the polymer has a molecular weight of 50,000 to 1,000,000, a glass transition temperature (Tg) of 50-80° C., and comprises 90-100 wt. % of the total solids in the coating.
The method of applying a coating to a metal substrate using a manifold flood and squeegee roll configuration or alternatively roll coater techniques; wherein the roll hardness, shape, pressure and speed are chosen to ensure that the coating composition forms a continuous wet film on the metallic substrate surfaces when the strip travels at up to 600 feet per minute; and the wet film has a uniform thickness of 2 mil (0.002 inch) or less.

18 Claims, 1 Drawing Sheet

Related U.S. Application Data

(60) Provisional application No. 61/223,541, filed on Jul. 7, 2009.

(51) Int. Cl.

| | | |
|---|---|---|
| *C09D 135/06* | (2006.01) | |
| *C08K 3/00* | (2018.01) | |
| *C08K 5/00* | (2006.01) | |
| *C09D 125/08* | (2006.01) | |

(52) U.S. Cl.
CPC ......... *C09D 125/08* (2013.01); *C09D 133/08* (2013.01); *C09D 135/06* (2013.01); *Y10T 428/256* (2015.01); *Y10T 428/265* (2015.01)

(56) References Cited

U.S. PATENT DOCUMENTS

| | | | |
|---|---|---|---|
| 4,070,510 | A | 1/1978 | Kahn |
| 4,098,951 | A | 7/1978 | Wolff |
| 4,288,357 | A | 9/1981 | Kanazawa |
| 4,294,939 | A | 10/1981 | Taniguchi |
| 5,085,696 | A | 2/1992 | Muller |
| 5,151,297 | A * | 9/1992 | Robbins ............... C10M 107/28 427/178 |
| 5,254,619 | A | 10/1993 | Ando |
| 5,580,933 | A | 12/1996 | Verge |
| 5,612,136 | A | 3/1997 | Everaerts |
| 5,783,303 | A | 7/1998 | Tsuei |
| 5,783,622 | A | 7/1998 | Sabata et al. |
| 5,795,649 | A | 8/1998 | Cosentino |
| 5,922,475 | A | 7/1999 | Barancyk |
| 6,608,143 | B1 | 8/2003 | Fukuoka |
| 6,620,890 | B1 | 9/2003 | Yamashita |
| 6,673,453 | B2 | 1/2004 | Beavers |
| 6,758,891 | B2 | 7/2004 | McCormick |
| 6,758,916 | B1 | 7/2004 | McCormick |
| 6,875,479 | B2 | 4/2005 | Jung |
| 7,063,895 | B2 | 6/2006 | Rodriques et al. |
| 7,179,404 | B1 | 2/2007 | Viswanathan |
| 7,232,479 | B2 | 6/2007 | Poulet |
| 7,429,627 | B2 | 9/2008 | Szmanda |
| 7,585,902 | B2 | 9/2009 | Trogolo |
| 2002/0037403 | A1 | 3/2002 | Yoshida |
| 2002/0114884 | A1 | 8/2002 | Friedersdorf et al. |
| 2006/0099429 | A1* | 5/2006 | Domes ..................... C09D 4/00 428/447 |
| 2006/0100353 | A1 | 5/2006 | Barsotti et al. |
| 2006/0233955 | A1* | 10/2006 | Smith ..................... C09D 5/002 427/299 |
| 2007/0172593 | A1 | 7/2007 | Sinsel et al. |
| 2008/0249207 | A1 | 10/2008 | Whiteley et al. |
| 2011/0008615 | A1 | 1/2011 | Myers |

FOREIGN PATENT DOCUMENTS

| | | |
|---|---|---|
| CN | 1 970 618 A | 5/2007 |
| CN | 101 372 582 A | 2/2009 |
| CN | 101 392 136 A | 3/2009 |
| CN | 102 482 528 A | 5/2012 |
| EP | 2 451 880 | 5/2012 |
| JP | H04-222666 A | 8/1992 |
| JP | H07-090219 A | 4/1995 |
| JP | H09-124812 A | 5/1997 |
| JP | 2004-291445 A | 10/2004 |
| JP | 2005-076081 | 3/2005 |
| JP | 2007-098582 A | 4/2007 |
| JP | 5631990 B2 | 11/2014 |
| KR | 10-1421038 B1 | 7/2014 |
| MX | 2012000432 A | 2/2012 |
| WO | WO 1997/008260 A1 | 3/1997 |
| WO | WO 1999/029795 A1 | 6/1999 |
| WO | WO 2002/031063 A1 | 4/2002 |
| WO | WO 2003/011583 | 2/2003 |
| WO | WO 2004/076568 A1 | 9/2004 |
| WO | WO 2006/052982 | 5/2006 |
| WO | WO 2007/085080 A1 | 8/2007 |

OTHER PUBLICATIONS

Canadian Office Action dated Nov. 28, 2012 for Application No. CA 2,766,185, 2 pgs.
Chinese Office Action dated Sep. 11, 2013 for Application No. CN 201080030730.6, 11 pgs.
European Exam Report dated Oct. 16, 2012 for Application No. EP 10 731 891.7, 4 pgs.
European Patent Office Communication, dated Dec. 9, 2013 for Application No. Ep 10731891.7, Third Party Observation for Application No. EP 20100731891 submitted on Nov. 27, 2013 by anonymous.
Indian Office Action dated Sep. 18, 2015 for Application No. 5102/KOLNP/11, 4 pgs.
International Search Report dated Nov. 9, 2010 for Application No. PCT/US2010/041041, 5 pgs.
International Preliminary Report on Patentability for Application No. PCT/US2010/041041 dated Jan. 19, 2012.
Japanese Office Action dated Apr. 16, 2013 for Application No. JP 2012-519663, 8 pgs.
Japanese Office Action dated May 7, 2014 for Application No. JP 2012-519663, 8 pgs.
Korean Office Action dated Jun. 28, 2013 for Application No. KR 10-2012-7003239, 4 pgs.
Korean Office Action dated Mar. 30, 2014 for Application No. KR 10-2012-7003239, 16 pgs.
Mexican Office Action dated Jun. 24, 2014 for Application No. MX/a/2012/000432 6 pgs.
Abstract for Handbook of Environmental Degradation of Materials, William Andrew Inc. (2005) Chap. 18.
Abstract for Mueller, B. et al., "Corrosion inhibition of copper and brass pigments in aqueous alkaline media by copolymers," Progress in organic coatings, vol. 37(3-4) (1999) pp. 193-197.
Abstract for Steel Dynamics, http//news.thomasnet.com/companystory/475809, Feb. 2006.
Database WPI Week 200934 Thomson Scientific, London, GB; AN 2009-G35736 & CN 101 392 136 A (Shenzhen Haichuan Ind Co Ltd) Feb. 25, 2009, XP-002606319.
Database WPI Week 200940 Thomson Scientific, London, GB; AN 2009-G78037 & CN 101 392 136 A (Shenzhen Haichuan Ind Co Ltd) Mar. 25, 2009, XP-002606320.
Williams, D. et al, Guide to Cleaner Technologies: Organic Coating Replacements, Diane Publishing (1994) pp. 1-91.

* cited by examiner

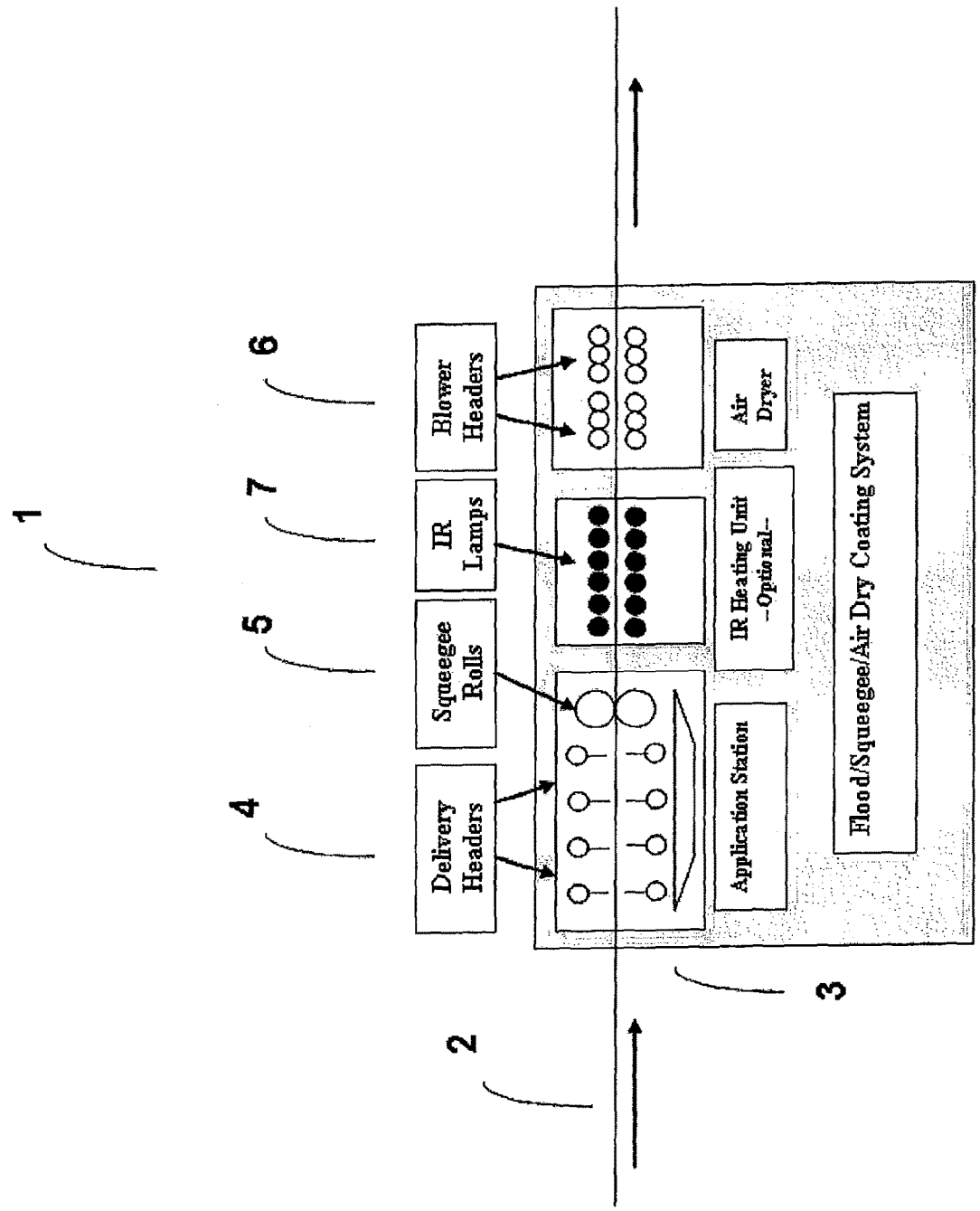

POLYMER COATED METALLIC SUBSTRATE AND METHOD FOR MAKING

CROSS REFERENCE TO RELATED APPLICATIONS

The present application is a continuation of U.S. patent application Ser. No. 12/830,618, entitled "Polymer Coated Metallic Substrate and Method for Making," filed on Jul. 6, 2010 and published on Jan. 13, 2011 as U.S. Pat. Pub. No. 2011/0008615, which in turn claims the benefit of the provisional patent application Ser. No. 61/223,541, filed on Jul. 7, 2009, the disclosures of which are hereby incorporated by reference in their entirety.

FIELD OF THE INVENTION

The present application relates to metal production. In particular, it relates to a polymer coating composition, a method for applying this coating to a metal substrate to form a continuous film and the subsequent performance of the metal/polymer composite material.

BACKGROUND

Coatings are often applied to steel prior to coiling. These systems may be applied in order to prevent corrosion of the steel during shipping and processing and to act as lubricants when the steel is formed. Two types of coatings commonly used to coat steel prior to coiling are: (1) liquid coatings and (2) cured dry film coatings. Each of these coatings may have certain drawbacks. Liquid oil type coatings may be messy, in part because they migrate and flow under pressure. This decreases their ability to protect the metal during storage or shipping and limits the performance of the metal during fabrication processes such as stretching, bending and drawing. Liquids may also become airborne and create environmental concerns related to clean-up/disposal and worker safety. Cured dry film coatings are polymers that require a chemical reaction typically performed at elevated temperature that is time-consuming and expensive. Ovens are expensive and require a large footprint on high speed metal processing lines. In many cases the coating material is dissolved in an environmentally restricted solvent that is evaporated during the heating process required for curing. The evolved solvents need to be incinerated or otherwise contained in order to meet environmental constraints. Other types of coatings that are applied to metals are non film forming systems such as chromates, phosphates and silanes. These may involve the use of hazardous chemicals, complex processing steps or are limited to specific applications. In many cases, the coatings discussed above are applied during operations separate and subsequent to normal mill processing thereby resulting in increased operational and transportation costs.

BRIEF SUMMARY

A composite material comprising a metallic substrate and a coating on at least one side of the metallic substrate, wherein the coating comprises an acrylic or styrene-acrylic based polymer and is less than about 0.2 mils thick, wherein the polymer has a molecular weight of 50,000 to 1,000,000, a glass transition temperature (Tg) of 50-80° C., and comprises 90-100 wt. % of the total solids in the coating.

The method of applying a coating to a metal substrate using a manifold flood and squeegee roll configuration or alternatively roll coater techniques; wherein the roll hardness, shape, pressure and speed are chosen to ensure that the coating composition forms a continuous wet film on the metallic substrate surfaces when the strip travels at up to 600 feet per minute; and the wet film has a uniform thickness of 2 mil (0.002 inch) or less.

These and other objects and advantages shall be made apparent from the accompanying drawings and the description thereof.

BRIEF DESCRIPTION OF THE FIGURES

It is believed the present application will be better understood from the following description taken in conjunction with the accompanying FIGURES. The figures and detailed description that follow are intended to be merely illustrative and are not intended to limit the scope of the invention.

FIG. 1 depicts a schematic diagram showing an exemplary system for coating a metal strip.

DETAILED DESCRIPTION

The following description of certain examples of the current application should not be used to limit the scope of the present application. Other examples, features, aspects, embodiments, and advantages of the application will become apparent to those skilled in the art from the following description. Accordingly, the figures and description should be regarded as illustrative in nature and not restrictive.

The current technology addresses environmental and hazardous chemical problems by using a water based polymer system that may be rapidly dried at ambient temperatures on existing high speed steel processing lines. It may be chemically tailored to meet the end use requirements of many of the current liquid, cured dry film, and non-film forming coatings including corrosion protection and customer processing enhancements. This polymer based coating may be applied in a cost effective manner on existing mill processing lines using procedures similar to that used for oils/lubes. Expensive application and cure equipment is not required. Since water is the major component, environmental issues are minimized. The resulting product is a polymer/metal composite material that may be processed using conventional stretching, drawing, bending, welding and painting techniques associated with metal fabrication. The composite material allows the metal component of the composite to perform at a level commensurate with its inherent properties without the limitations imposed by conventional metal lubricating systems that may lead to galling, scaling, powdering or flaking during typical metal processing operations. The use of the composite material also minimizes the need for rough metal surface textures needed to hold liquid based oils during forming of conventional metal materials. Smoother surfaces may result in improved paint appearance on surface critical items such as the exterior panels of automobiles and appliances.

A dry, continuous polymer film on the surface of the strip may be formed in the mill that can be chemically modified to provide specific properties such as corrosion, antimicrobial, antifingerprint, or antioxidation protection, as well as formability enhancements. This system can be applied on existing high speed mill processing lines using relatively inexpensive flood and squeegee techniques. Since curing reactions are not required, the water based system is dried using small footprint hot air dryers instead of large curing ovens. Since water is the major fugitive component of the system, environmental restrictions during processing are minimized. Eliminating the need for additional processing steps possibly at outside processors as well as the need for expensive application/cure equipment greatly lowers the cost of applying these desirable material performance enhancement coatings. The resulting polymer-metal composite may be processed using conventional sheet/strip forming, joining, and finishing techniques currently utilized by the automotive, appliance and HVAC industries. These coatings therefore improve the performance of the resulting metal component of the polymer metal composite without significantly increasing costs.

The coating may enhance the formability of the metal strip by minimizing metal to metal contact thereby allowing the material to perform at a level consistent with its inherent mechanical properties. This reduces or eliminates the need for additional liquid type forming or stamping lubricants which are not ecologically friendly and by their physical nature as incompressible liquids likely to limit the performance of the material since they flow away from the critical high pressure areas. Use of the coating may also reduce damage to metal forming dies and thereby improve press uptime. The coating may be easily removed from the metal; however, it may also be formulated to remain on the finished part to act as a pretreatment or primer for subsequent operations such as painting.

One embodiment of the coating contains an acrylic or styrene-acrylic polymeric water-based dispersion or emulsion. Examples are the SYNTRAN or Magatran polymers from Interpolymer Corporation or the DURAPLUS and DURAGREEN polymers from the Rohm and Hass division of Dow Chemical. Typical polymers include those derived from acrylate, methacrylate and styrene monomers. The chemistries and concentrations of the polymers or copolymers are chosen to affect durability, hardness, gloss, and removability of the coating. In one embodiment, the polymers are not crosslinked.

In one embodiment, the polymers have a molecular weight of greater than 50,000. The molecular weight may be from 100,000 to 1,000,000. There may also be lower molecular weight oligomers of similar chemistry present. The polymers are the main film forming ingredient in the coating, and are present at a level between 50-95%, greater than 80%, or between about 90% and 100% of the solids components of the coating. The glass transition temperature (Tg) of the polymers may be less than 80° C., in the range of 50° C. to 80° C., or in the range of 50° C. to 70° C.

In one embodiment, the coating may have one or more of these attributes: the ability to be applied as a uniform liquid film on the surface of a moving metal strip; dried rapidly using air blowers with minimal non-aqueous based emissions; and form an adherent, tough, durable continuous dry film that enhances the corrosion and forming performance of the substrate. The chemistries and concentrations of the polymers or copolymers may be chosen to affect durability, hardness, leveling, gloss, coefficient of friction, removability, etc. To optimize these properties and tailor the coating for specific applications, several additional components may be added.

In one embodiment, prior to drying the coating composition to form the coating, the polymers are in an emulsion or dispersion where the size of the spherical particles may be less than 1 micron. They may have a size of 0.1 to 0.5 microns. The coating composition is typically more than 60% water. It may be between 70 and 85% water. The dispersion/emulsion viscosity may be less than 200 centipoise. It may be from 20 to 100 centipoise.

In one embodiment a plasticizer may be added to assist in forming a continuous film at temperatures as low as 10° C. The plasticizer remains as part of the final coating and is typically selected from phosphate esters, phthalate esters, benzoic acid esters, or fatty acid esters. An example of a plasticizer for acrylic or styrene acrylic copolymer based systems is tributoxyethyl phosphate. Plasticizers may be present between from 0 to 25% of the solids. Typically plasticizers are present at less than 5% of the solids.

In one embodiment a coalescing agents based on alkyl or aromatic ethers of ethylene glycol or propylene glycol such as diethylene glycol ethyl ether may be added to also assist in the formation of a continuous film. These additives have vapor pressures of 0.1 to 1.0 mm Hg at room temperature and are typically fugitive and don't remain with the final polymer. Both plasticizers and coalescing agents are chosen based on their oil/water solubility (hydrophobic-hydrophilic balance). Coalescing agents may be added in the range of 0-25% of solids to provide a desired property. Typically coalescing agents are present at less than 5% of the solids.

In one embodiment the liquid dispersion/emulsion may contain anionic or nonionic surfactants or wetting agents such as the fluorosurfactants based Masurf systems from Mason Chemical or Zonyl systems from DuPont, which typically reduce the surface tension to 50 dynes/cm or less, or 30 dynes/cm or less. These may be added at a level of 0-5%, or less than 1% of the total solids.

In one embodiment a defoamer, such as one of the silicone based SE series from Wacker Chemical, may be included at a level of less than 0.01%, or about 0.004 to about 0.005%. The formulation may contain paraffin, polyethylene, polyolefin or other wax type additives such as the A-C series from Honeywell or the Epolene series from Eastman Chemical not more than about 10%, or not more than about 5% total solids level to provide durability to the dried coating. These additives may have a molecular weight of 1000 to 5000.

In one embodiment alkali soluble resins (ASR) also known as leveling agents may be added at up to about 10%, or up to about 5% of total solids to enhance gloss, leveling characteristics, and removability of the coating. ASRs may have a molecular weight of 500 to 2000 and an acid number of 150-250. ASRs are chosen from the group of rosin adducts, acrylic resins, and styrene/maleic anhydride resins. A typical system would be the Michem MD-91530 acrylic resin dispersion.

In one embodiment polyvalent metal ions may be added to aid durability and removability. Examples of a polyvalent metal ions include zinc oxide based systems such as Chemcor ZAC products. Biocides and antimicrobial type additives, such as those from Agion Technologies, containing silver ions, may also be added to the dispersion/emulsion both to control the growth of microorganisms in the liquid during storage and to protect the coated surfaces of the final composite product. The coating composition may be modified to provide antifingerprint benefits to the resulting polymer/metal composite. Cesium, lanthanum zirconium, titanium, silicon or other rare earth type nano-particle additives may be included to impart oxidation/corrosion improvements to the final polymer/metal composite. The coating composition may comprise one or more of the following additives: micron or nano sized particulate; wherein the particulate comprises silver, cesium, silicon, or rare earth elements.

The final combination of the various components of the coating represents a balancing between the desired film properties such as hardness, coefficient of friction, gloss, etc and the ability to form a continuous film under the conditions associated with high speed metal processing lines. The liquid coating composition is applied to moving strip at room temperature. After drying, the coating forms an adherent dry, continuous polymer film on the surface of the metal strip. The final dry coating thickness may be less than 0.2 mils (0.0002 inches), or 0.05-0.1 mils (0.00005 to 0.0001 inches). Alternatively, the typical coating weight of the dried coating may be less than 400 mg/sq ft, or in the range of 150-250 mg/sq ft. The dried coating weight of the composite material may be from 50 to 350 milligrams of coating per square foot of the metallic substrate.

The amount of tackiness may be minimized to eliminate the possibility of blocking when the strip is subsequently coiled. The solid, continuous polymer film may eliminate the migration associated with liquid oil based coatings. The coating may be clear or color tinted. In one embodiment, it provides a reduced friction coefficient of less than 0.2, or 0.05-0.15. This reduces constraints associated with surface friction effects during forming operations. In one embodiment, the coating provides a minimum surface pencil hardness value of H in order to minimize pick-off when in contact with die surfaces. The resulting polymer/metal composite may attain a 0-T or 1-T bend radius without surface cracking or powdering and there is no removal of the coating during adhesive tape pull after cross hatch scribing. These attributes may also ensure the integrity of the polymer/metal bond and therefore minimize loss of the coating during processing.

The dried coating may be easily removed from the metal strip by cleaning methods known in the art, for example by using well-known alkaline cleaners or solvents such as acetone. The dried coating may also be left on the strip. The dried coating may also be applied on the surface of a strip (2) to act as a primer for subsequent operations, such as painting or coating. It is well known by those skilled in the art that various paints and coatings are applied to steel for numerous reasons. In view of this use, the dried coating may act as a primer in preparation for subsequent painting or other coatings. A strip coated with this system may also be welded using standard welding process procedures.

The coating may be applied to bare steel, such as stainless, carbon, or electrical steel. It may also be applied to metal coated steel, such as aluminized steel or galvanized steel. The coating may also be applied to non-ferrous metals, such as aluminum.

One method of applying the liquid coating composition is the flood and squeegee method. The liquid coating composition may be applied at a wet film thickness of 2 mil (0.002 inch) or less, or from about 0.5 to 1.0 mils. The thickness is controlled in part by varying the ratio of polymer to water and the level of the various compositional components. These factors will influence the application viscosity. The applied coating may have a volatile organic compound (VOC) level of 0.5 lb/gal or less and an applied viscosity of less than 250 centipoise, or 20-100 centipoise. Roll pressure, roll hardness, and roll geometry as well as the metal surface characteristics such as surface roughness may also influence coating thickness. More expensive conventional rolls coaters may also be used to apply the coating to moving strip. However the characteristics of the coating do not require this approach.

In one embodiment the liquid coating may be air dried, without the need for curing. In other words, there is no elevated temperature chemical reaction, such as cross-linking, that occurs as the coating dries. Convection ovens or induction heating units are not required to achieve the desired properties even at the high process speeds (50-600 ft/min) encountered in metal processing lines. Therefore the drying footprint of the process is minimized.

In one embodiment the drying may be accomplished by any methods known in the art, including hot air blowers or infrared radiation. The coating system may also be chemically configured to permit drying using ultraviolet radiation. In one embodiment, the drying occurs at a peak metal temperature of 110° F. or less. In one embodiment, the drying time is 5 seconds or less.

In one embodiment a metal strip is coated with an aqueous acrylic or styrene-acrylic copolymer dispersion (shown in the FIGURE). A metal strip (2) is coated with SYNTRAN® AX-270-LFHS acrylic co-polymer dispersion while the metal strip (2) passes through the application station (3). SYNTRAN® AX-270-LFHS acrylic co-polymer dispersion is manufactured by Interpolymer Corporation having an address at 200 Dan Road, Canton, Mass., 02021. The polymers in the liquid coating have a molecular weight of less than 1,000,000. The coating composition has sodium lauryl sulfate type surfactants added at the level of less than 2% by weight to aid wetability. The water based dispersion has a viscosity of less than 250 centipoise.

Other suitable substances that may be used to coat a metal strip include: FUTURE® Floor Finish, produced by SC Johnson Company having an address at 1525 Howe Street, Racine, Wis., 53403; and QUICK SHINE® Floor Finish, produced by Holloway House Incorporated having an address at 309 Business Park Drive, Fortville, Ind., 46040; and the DURAPLUS/DURAGREEN systems from the Rohm and Haas division of Dow Chemical Company, Midland, Mich. Other substances may be used that form a thin, flexible plastic film by drying onto a metal strip and at least protect the steel strip from corrosion. Upon drying, these coatings will provide the surface of the strip with a coefficient of friction approximately equal to or less than 0.5. In liquid form, the coating composition will include acrylic or styrene-acrylic copolymers having a molecular weight for example between 50,000 and 1,000,000 and viscosities for example between 50 and 200 centipoise. The coatings may contain additives to tailor the properties of the composite to specific needs such as antimicrobial protection, gloss, removability, toughness, color and durability.

The FIGURE depicts an exemplary application process (1). In this example, process (1) involves passing a metal strip (2) free of dirt, oil, and other surface contaminants through an application system (3) where the liquid acrylic or styrene-acrylic co-polymer coating is flooded on one or both sides of the strip using one or more headers (4). The flooded strip then passes through squeegee rolls which limit the amount of coating that remains on the strip (5). Squeegee roll pressure, roll geometry and the roll material as well as the strip surface and polymer viscosity will affect the amount and uniformity of the liquid that remains on the strip. The remaining liquid polymer coating is dried with air blowers (6). Alternatively, the strip may be passed through an infrared radiation system that may aid in strip drying (7). This infrared system may be used by itself or in tandem with the air drying. Although not depicted, the coating may also be chemically modified so that the drying process is accomplished using ultraviolet radiation. Due to the low temperatures needed to dry the strip subsequent cooling or water quenching that is commonly used for cured coatings is not needed. The coated strip is then ready for further processing and coiling.

In one embodiment, the dried SYNTRAN AX-270-LFHS coating has a coating weight of 50-150 mg/sq ft and provides a coefficient of friction of less than 0.5. It further provides a minimum surface pencil hardness of H. The coating adheres sufficiently well to the metal that a 5B rating is achieved after cross hatch scribe testing according to ASTM D3359. After drying, the strip is able to be wound into a coil with no measurable blocking when subsequently unwound for further processing.

In one embodiment, using procedures described in ASTM D4145, the resulting metal/polymer composite may be bent to a 0 T radius without peeling, flaking, or powdering when various substrates including galvannealed or stainless steel are used as the metal component. The resulting composite material may also be formed into modified Swift cups with a 1 inch deep draw without peeling, flaking, powdering, or galling of the sidewalls by the die surface. When the polymer component is removed, for instance using an alkaline cleaner, the remaining metal has a pristine surface that is therefore less susceptible to finishing and painting blemishes and defects. The cleaned surface readily accepts pretreatments and paints.

In one embodiment, a water based acrylic polymer such as SYNTRAN AX-270-LFHS supplied by Interpolymer Corporation can be applied to moving strip on an existing metal processing line using flood/squeegee techniques where the wet film thickness is sufficient to result in a continuous tack free dry film thickness on one or both surfaces of 0.05-0.1 mils (0.00005-0.0001 in) or alternatively a coating weight of 150-250 mg/sq ft/side. This system can be tinted for identification purposes and may have additives that affect the coefficient of friction, corrosion, surface roughness and antimicrobial properties. Drying of the coating is accomplished using Hoffman type hot air dryers such that the temperature of the strip reaches 110-120° F. which is sufficient to result in a tack free surface thereby permitting subsequent strip processing such as temper rolling or coiling. The application/drying equipment is typically available on many existing high speed mill processing lines. Therefore additional operational and transportation costs are eliminated. The resulting composite is able to be formed into components such as those requiring stretching, bending or drawing without the use of conventional wet lubricants.

Percentages of ingredients described herein are weight percents.

Having shown and described various embodiments, further adaptations of the methods and systems described herein may be accomplished by appropriate modifications by one of ordinary skill in the art without departing from the scope of the application. Several of such potential modifications have been mentioned, and others will be apparent to those skilled in the art. For instance, the examples, embodiments, ratios, steps, and the like discussed above may be illustrative and not required.

EXAMPLES

Example 1

Panels of galvanized and galvannealed carbon steel, aluminized carbon, and stainless steel have been coated using laboratory draw down bars and roll coating equipment followed by air drying. This allowed coating procedures to be developed using various chemistries and roll configurations to verify performance. SYNTRAN systems from Interpolymer Corporation that were examined were AX-270-1, AX-270-5, AX270-7, AX-270-LF, and AX-270-HS. Variations included percentage of polymer in the aqueous solution and the effect of additives that would influence substrate wetting and solution foaming. These tests demonstrated that the system was able to be applied over a thickness range of 100-400 mg/sq ft, that rapid drying of <5 sec necessary for use on high speed mill processing lines could be achieved using minimal heat, that pencil hardness of >1H was obtainable along with resistance to blocking, that adequate substrate adhesion was achieved to permit one inch deep Swift cups to be drawn and 0-T and 1-T radius bends to be formed without cracking and to verify removability in industrial alkaline cleaners. Based on these tests, the SYNTRAN AX-270-LFHS system was developed.

Example 2

The SYNTRAN® AX-270-LFHS system was applied to moving strip on a continuous hot dip galvanizing line after application of the zinc coating. The galvanized strip thicknesses were 0.050-0.055 inch and the strip width was 38-41 inches. The speed of the moving strip in the constant speed process section of the line where the polymer dispersion was applied was 200-250 feet/min. The coating was applied using existing flood and squeegee equipment. Both sides of the strip were coated. The polymer dispersion was applied at the supplied viscosity of approximately 200 cps as well as at lower viscosities of 25-100 cps obtained by dilution with water. The dispersion was pumped from a holding drum through headers that extended across the horizontal strip and the flow was regulated so that a pool of the dispersion developed behind the squeegee rolls. In this trial the squeegee rolls rode on the strip and were not independently driven. The pressure on the rolls was adjusted to provide a uniform wet film on both surfaces across the entire width of the strip. Immediately after exiting the squeegee rolls, the coated strip passed through a series of plenums connected to Hoffman type air blowers. The time in the plenum section was <2 sec. After exiting the plenum area, the strip was dry, adherent and uniform in appearance. No pick-off of the coating was noted on subsequent processing rolls that contacted the strip. One of the coils was in-line temper rolled after exiting the coating application section with no degradation of the coating integrity. The coating weights were subsequently measured using weigh/strip/weigh techniques to be approximately 100 mg/sq ft/side. The material was subsequently wound into coils. After approximately 2 weeks, the coils were taken to an off-line operation where they were unwound. No coil blocking was detected. Samples were removed from the coils and were tested for formability. Approximately 1 inch deep modified Swift cups were able to be formed without flaking, peeling or powdering of the coating. The coating was also able to be sheared, bent and handled using procedures typical for metal strip. Pencil hardness was 2H. The 60 degree gloss as measured by a Byk Mirror gloss meter was greater than 300 for the bare galvanized surface and less than 300 for the coated surface. For the samples that were temper rolled the gloss was less than 100 for the coated samples and greater than 100 for the bare galvanized samples. Gloss was found to be a good indicator of the presence of the coating especially on relatively reflective surfaces. This particular version of the coating could also be removed from the strip or formed parts using hot alkaline cleaners typically used to remove oil and processing fluids from metal strip.

What is claimed is:

1. A method of making a composite material comprising a coating and a metallic substrate, the method comprising the steps of:

(a) applying a polymer composition to at least one side of the metallic substrate using a technique of manifold flooding and squeegee rolling, or roll coating;
  wherein the polymer composition comprises acrylic or styrene-acrylic based polymer:
    i. having a molecular weight of greater than 50,000;
    ii. having a glass transition temperature (Tg) of 65-80° C.; and
    iii. comprising 90-100 wt. % of total solids in the polymer composition;
(b) forming the polymer composition into a continuous wet film on the at least one side of the metallic substrate which is traveling at up to 600 feet per minute; and
(c) drying the continuous wet film to form the coating having a uniform dried thickness of less than about 0.2 mils.

2. The method of claim 1, wherein the composite material is formable into a 1 inch deep drawn modified Swift cup without galling, flaking, peeling or powdering.

3. The method of claim 1, wherein the polymer composition is applied to the metallic substrate at a wet thickness of between 100 to 400 milligrams per square foot of the metallic substrate.

4. The method of claim 3, wherein the continuous wet film is air dried in less than 5 seconds to produce a coating with a pencil hardness of H minimum according to ASTM D3363.

5. The method of claim 1, wherein the coating has a uniform dried thickness of from 0.05 to 0.1 mils.

6. The method of claim 1, wherein the coating is removable from the metallic substrate with an alkaline solution.

7. The method of claim 1, wherein the coating is not chemically cured.

8. The method of claim 1, wherein the coating does not comprise forming or stamping lubricants.

9. The method of claim 1, wherein the dried coating weight of the composite material is 50 to 350 milligrams of coating per square foot of the metallic substrate.

10. The method of claim 1, wherein the polymer composition further comprises one or more of the following additives:
  (a) a plasticizer selected from the group consisting of phosphate esters, phthalate esters, benzoic acid esters, and fatty acid esters;
  (b) a coalescing agent selected from alkyl or aromatic ethers of ethylene glycol or propylene glycol;
  (c) paraffin, polyethylene or polyolefin wax additives;
  (d) alkali soluble resins selected from the group consisting of rosin adduct;
  (e) polyvalent metal ions;
  (f) defoamers;
  (g) tints/colorants;
  (h) micron or nano sized particulate; wherein the particulate is selected from the group consisting of silver, cesium, silicon, or rare earth elements.

11. The method of claim 1, wherein adhesion of the coating to the metallic substrate is rated 5B when tested according to ASTM D3359.

12. A method of making a composite material comprising a coating and a metallic substrate, the method comprising the steps of:
  (a) applying an emulsion or dispersion comprising spherical particles of acrylic or styrene-acrylic based polymers to at least one side of the metallic substrate, using a technique of manifold flooding and squeegee rolling, or roll coating, wherein the acrylic or styrene-acrylic based polymers have glass transition temperature (Tg) of 50-80° C. and a molecular weight of from 125,000 to 1,000,000;
  (b) forming the emulsion or dispersion into a continuous wet film on the at least one side of the metallic substrate which is traveling at up to 600 feet per minute; and
  (c) drying the continuous wet film to form the coating having a uniform dried thickness of less than about 0.2 mils;
wherein, the composite material is formable into a 1 inch deep drawn modified Swift cup without galling, flaking, peeling or powdering.

13. The method of claim 12, wherein the continuous wet film is air dried in less than 5 seconds to produce a coating with a pencil hardness of H minimum according to ASTM D3363.

14. The method of claim 12, wherein coating has a uniform dried thickness of from 0.05 to 0.1 mils.

15. The method of claim 12, wherein the coating is not chemically cured.

16. The method of claim 12, wherein the polymer composition additionally comprises one or more of the following additives:
  (a) a plasticizer selected from the group consisting of phosphate esters, phthalate esters, benzoic acid esters, and fatty acid esters;
  (b) a coalescing agent selected from alkyl or aromatic ethers of: ethylene glycol or propylene glycol;
  (c) paraffin, polyethylene or polyolefin wax additives;
  (d) alkali soluble resins selected from the group consisting of rosin adduct;
  (e) polyvalent metal ions;
  (f) defoamers;
  (g) tints/colorants;
  (h) micron or nano sized particulate; wherein the particulate is selected from the group consisting of silver, cesium, silicon, or rare earth elements.

17. The method of claim 12, wherein adhesion of the coating to the metallic substrate is rated 5B when tested according to ASTM D3359.

18. A method of making a composite material comprising a coating and a metallic substrate, the method comprising the steps of:
  (a) applying a polymer composition to at least one side of the metallic substrate via manifold flooding and squeegee rolling, wherein the polymer composition comprises an acrylic or styrene-acrylic based polymer, wherein the polymer:
    1. has a molecular weight of from 125,000 to 1,000,000;
    2. has a glass transition temperature (Tg) of 50-80° C.; and
    3. comprises 90-100 wt. % of total solids in the polymer composition;
  b) forming a continuous wet film on the at least one side of the metallic substrate when the metallic substrate travels at up to 600 feet per minute; and
  c) drying the continuous wet film to form the coating, wherein the coating:
    i. has a uniform dried thickness of less than about 0.2 mils;
    ii. has a pencil hardness of H minimum according to ASTM D3363; and
    iii. is formable into a 1 inch deep drawn modified Swift cup without galling, flaking, peeling or powdering; and iv. is bendable to a OT radius (ASTM 4145) without galling, flaking, peeling, or powdering.

\* \* \* \* \*